(12) United States Patent
Dinan et al.

(10) Patent No.: US 8,259,684 B1
(45) Date of Patent: Sep. 4, 2012

(54) SEASONALITY OPTIMIZATION OF WIRELESS NETWORKS

(75) Inventors: Esmail Hejazi Dinan, Herndon, VA (US); Brigido Subiaur, Leesburg, VA (US); Mohd Khalil Abubakar, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 948 days.

(21) Appl. No.: 12/261,114

(22) Filed: Oct. 30, 2008

(51) Int. Cl.
*H04W 4/00* (2009.01)
(52) U.S. Cl. .................................................. 370/332
(58) Field of Classification Search .................. None
See application file for complete search history.

(56) References Cited

U.S. PATENT DOCUMENTS

| | | | | |
|---|---|---|---|---|
| 6,137,994 A | * | 10/2000 | Alterman et al. | 455/69 |
| 2004/0104855 A1 | * | 6/2004 | Nomiyama et al. | 343/702 |
| 2005/0186915 A1 | | 8/2005 | Williams | |
| 2006/0109923 A1 | * | 5/2006 | Cai et al. | 375/260 |
| 2007/0238416 A1 | | 10/2007 | Williams | |

* cited by examiner

*Primary Examiner* — Yong Zhou
(74) *Attorney, Agent, or Firm* — O'Brien Jones PLLC

(57) ABSTRACT

What is disclosed is a method of detecting a current seasonal transition from fall to winter or from winter to spring in a geographic area. The method includes receiving a plurality of wireless signals from a plurality of wireless communication devices in the geographic area, generating signal strength data for the received wireless signals, processing the signal strength data to generate current signal strength data patterns indicating current signal strength changes over a time period, and comparing the current signal strength data patterns to historical signal strength data patterns associated with past seasonal transitions in the geographic area. The method also includes detecting the current seasonal transition in the geographic area based on the comparison, and generating an indicator when the current seasonal transition is detected.

20 Claims, 6 Drawing Sheets

SEASONALITY OPTIMIZATION OF WIRELESS NETWORKS

TECHNICAL FIELD

Aspects of the disclosure are related to the field of communications, and in particular, wireless coverage in wireless communication networks.

TECHNICAL BACKGROUND

Wireless communication networks typically include wireless communication devices which, via a wireless communication system, wirelessly communicate with further communication networks and equipment. The wireless communication system typically includes access nodes and associated equipment to route wireless communications over wireless links from the wireless communication devices to further communication networks, equipment, and destinations.

Typically, a wireless communication system will, at least in part, provide service for a geographic area where wireless communications between wireless communication devices and access nodes in the wireless communication system can occur. Unfortunately, seasonal variations, transitions, and associated effects upon wireless communications pose problems in wireless communication networks. Seasonal variations in the geographic area can impact the performance, reliability, crosstalk, and interference properties of wireless communications in the geographic area.

Overview

What is disclosed is a method of detecting a current seasonal transition from fall to winter or from winter to spring in a geographic area. The method includes receiving a plurality of wireless signals from a plurality of wireless communication devices in the geographic area, generating signal strength data for the received wireless signals, processing the signal strength data to generate current signal strength data patterns indicating current signal strength changes over a time period, and comparing the current signal strength data patterns to historical signal strength data patterns associated with past seasonal transitions in the geographic area. The method also includes detecting the current seasonal transition in the geographic area based on the comparison, and generating an indicator when the current seasonal transition is detected.

What is also disclosed is a method of detecting a current seasonal transition from fall to winter or from winter to spring in a geographic area. The method includes transmitting a plurality of wireless signals to a plurality of wireless communication devices in the geographic area, receiving signal strength data for the transmitted wireless signals from the wireless communication devices, processing the signal strength data to generate current signal strength data patterns indicating current signal strength changes over a time period, and comparing the current signal strength data patterns to historical signal strength data patterns associated with past seasonal transitions in the geographic area. The method also includes detecting the current seasonal transition in the geographic area based on the comparison, and generating an indicator when the current seasonal transition is detected.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
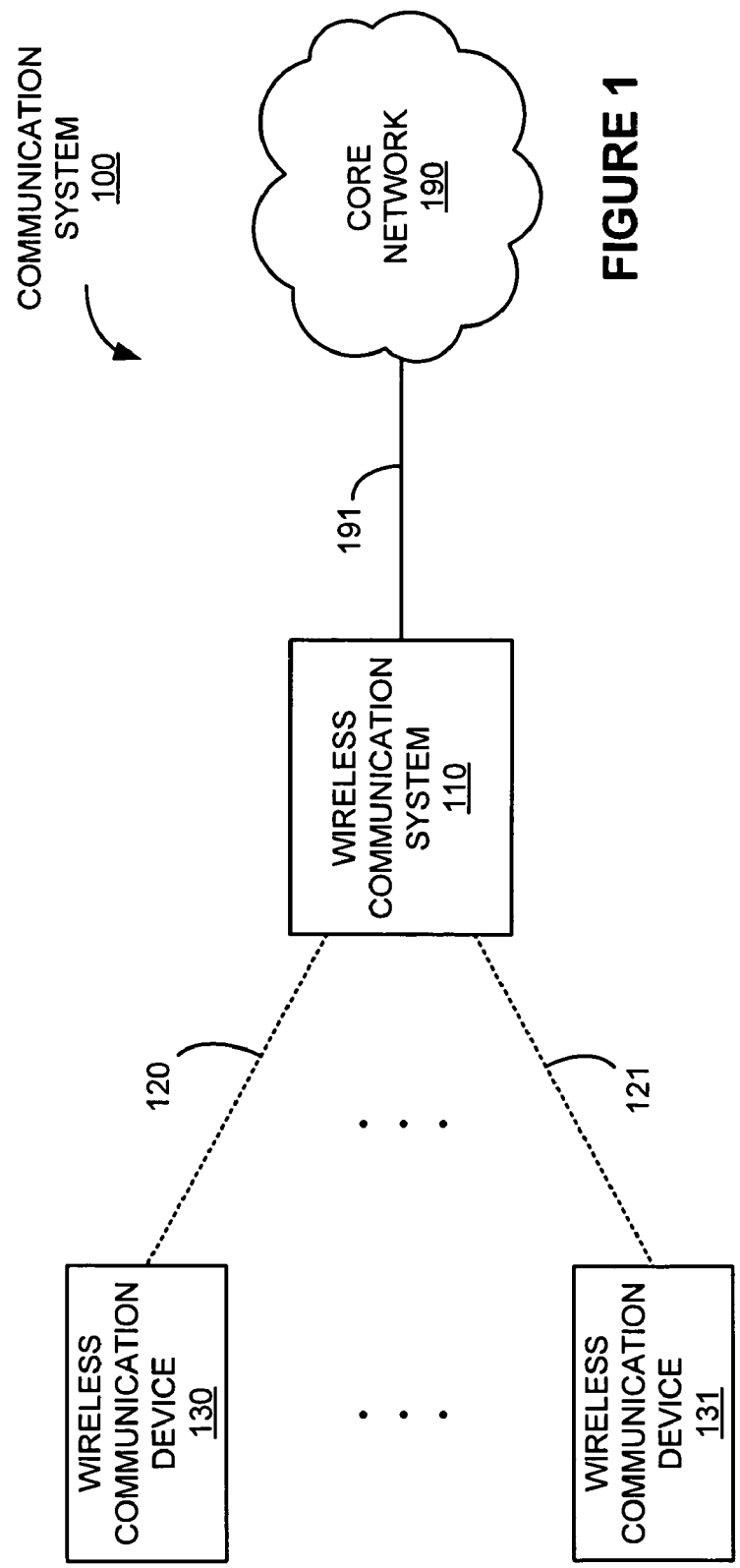
FIG. 1 is a system diagram illustrating a communication system.

FIG. 1 is a system diagram illustrating communication system 100. Communication system 100 includes wireless communication device 130, wireless communication device 131, wireless communication system 110, and core network 190. Wireless communication device 130 and wireless communication system 110 communicate over wireless link 120. Wireless communication device 131 and wireless communication system 110 communicate over wireless link 121. Wireless communication system 110 and core network 190 communicate over link 191.

Wireless communication devices 130 and 131 each comprise a telephone, transceiver, computer, digital assistant, smart phone, Internet appliance, or some other wireless communication apparatus—including combinations thereof. Although communication system 100, as shown in FIG. 1, includes two wireless communication devices, it should be understood that in other examples, more wireless communication devices could be in communication with wireless communication system 110.

Wireless communication system 110 includes wireless communications network equipment capable of communicating with wireless communication devices 130 and 131. Examples of wireless communication system 110 can include base stations, base transceiver stations, access service network (ASN) gateways, boomer stations, antennas, radio node controllers (RNC), mobile switching centers, call processing equipment, wireless access nodes, wireless access points, telephone switches, Internet routers, network gateways, as well as other type of communication equipment—including combinations thereof. In some examples, wireless communication system 110 acts as a gateway for communications between wireless communication devices 130 and 131 and core network 190.

Core network 190 could include an Internet network, wireless network, telephony network, optical network, enterprise network, local area network, packet data serving node, or (PDSN), or some other type of communication network or communication equipment—including combinations thereof. In some examples, core network 190 acts as a gateway for communications between wireless communication system 110 and further wireless communication systems, the Internet, or telephony systems.

Wireless links 120 and 121 use various communication media, such as air, space, or some other wireless transport media—including combinations thereof. Wireless links 120 and 121 could use protocols such as code division multiple access (CDMA), evolution-data optimized (EV-DO), worldwide interoperability for microwave access (WiMAX), long-term evolution (LTE), wireless fidelity (WiFi), global system for mobile communications (GSM), universal mobile telecommunications system (UMTS), or some other communication format—including combinations, variations, or improvements thereof.

Wireless links 120 and 121 may comprise many different signals sharing the same links. Wireless links 120 and 121 could include multiple signals operating in a single "airpath"—as represented by the dashed line in FIG. 1—comprising multiple frequencies, timeslots, time cycles, channels, directional links, transportation ports, logical transportation links, network sockets, packets, or communication directions. For example, communications and control signals between wireless communication devices 130 and 131 and wireless communication system 110 could share the respective wireless links 120 and 121, but be transferred over different frequencies, timeslots, time cycles, channels, directional links, transportation ports, logical transportation links, network sockets, packets, or in different directions—including combinations thereof.

Link 191 uses various communication media, such as air, space, metal, optical fiber, or some other signal propagation path—including combinations thereof. Link 191 could be wired or wireless and could use communication protocols such as Internet, Internet protocol (IP), transmission control protocol (TCP), local-area network (LAN), optical networking, hybrid fiber coax (HFC), telephony, T1, or some other communication format—including combinations, improvements, or variations thereof. Link 191 could be a direct link or might include various equipment, intermediate components, systems, and networks. Link 191 could include multiple signals operating in a single pathway in a similar manner as wireless links 120 and 121.

Figure 2:
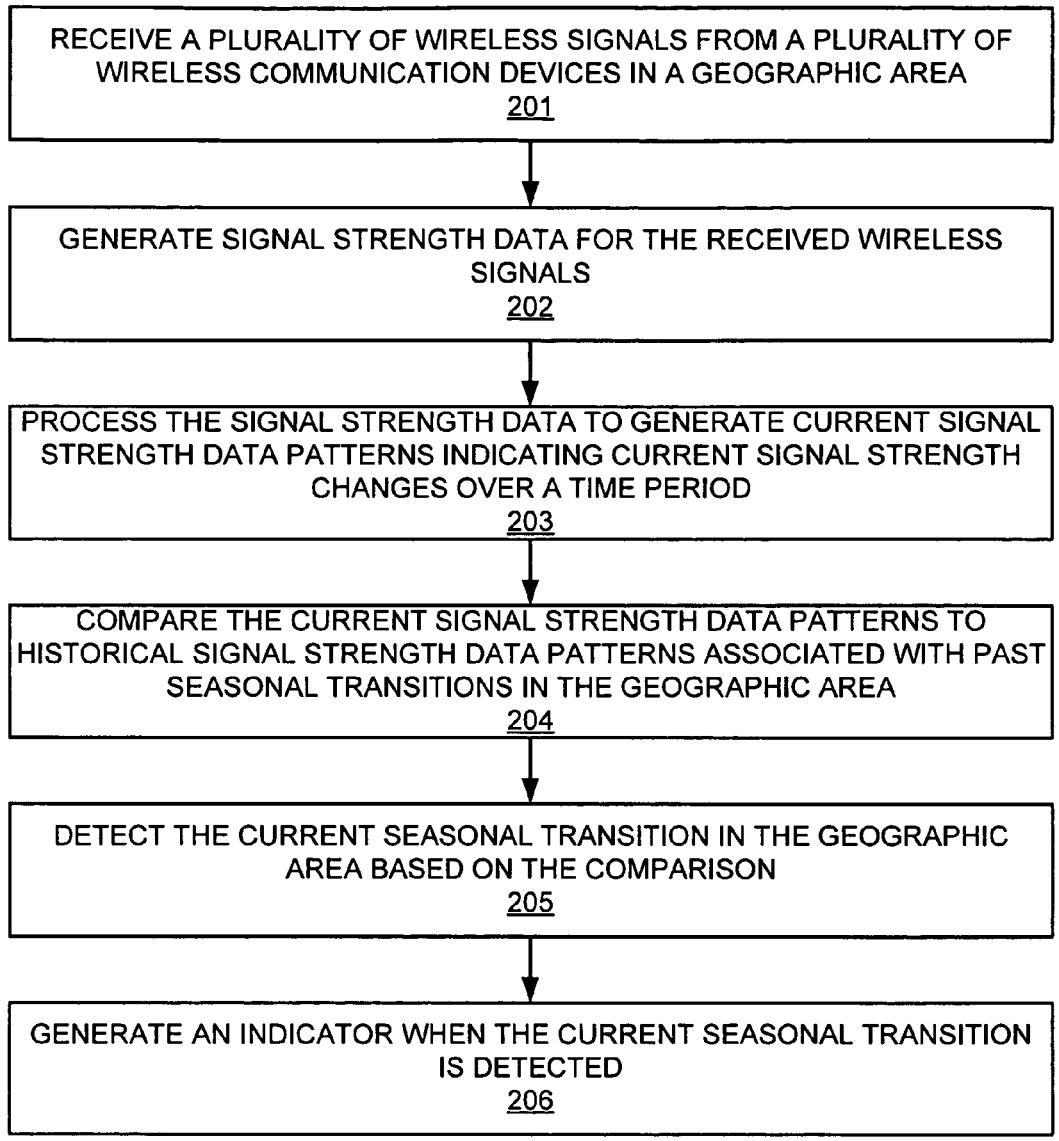
FIG. 2 is a flow diagram illustrating a method of operation of a communication system.

FIG. 2 is a flow diagram that illustrates an example method of operation of communication system 100, as found in FIG. 1. The phases shown in FIG. 2 are indicated herein parenthetically. In FIG. 2, wireless communication system 110 receives (201) wireless signals from wireless communication devices 130 and 131 in a geographic area. In some examples, the transfer of the wireless signals from wireless communication devices 130 and 131 could be initiated by a command from wireless communication system 110. In other examples, the wireless signals from wireless communication devices 130 and 131 could be wireless communications, such as user communications, and received throughout the operation of wireless communication devices 130 and 131.

In the example shown in FIG. 1, wireless communication devices 130 and 131 are in the same geographic area. In typical examples, since wireless communication devices 130 and 131 communicate with wireless communication system 110 over a finite geographic range, the geographic area, while of possibly varied size, would nonetheless typically depend upon the specific implementation of communication system 100. Thus, in some examples, the geographic area could represent a region of wireless signal coverage where wireless communication devices 130 and 131 could communicate over wireless links 120 and 121 with wireless communication system 110. In other examples, the geographic region could represent a region served by wireless communication system 110, a wireless coverage area of one or multiple access nodes within communication system 100, or other regions.

In some examples, wireless communication devices 130 and 131 have a substantially fixed location in the geographic area, such as a residence, business, or service provider location, while in other examples, wireless communication devices 130 and 131 are mobile throughout the geographic area.

Wireless communication system 110 generates (202) signal strength data for the received wireless signals from wireless communication devices 130 and 131. The signal strength data could include an RF signal strength, a signal to noise ratio (SNR), a signal to interference and noise ratio (SINR), carrier to interference and noise ratio (CINR), or other data of the wireless signals as determined by wireless communication system 110. In some examples, the signal strength data is determined by measuring a signal strength parameter for each of wireless communication devices 130 and 131.

Wireless communication system 110 processes (203) the signal strength data to generate current signal strength data patterns indicating how current signal strength data changes over a time period. The signal strength data could be processed over a present time period to develop a pattern of the signal strength data for that time period. The time period could be of a varied duration, depending upon the method used to process the signal strength data to develop a pattern. In some examples, the time period could be long, such as over the course of weeks.

In examples of fixed location wireless communication devices, the signal strength data could be determined for the fixed locations, with wireless communication devices 130 and 131 possibly acting as reference wireless communication devices. Changes in signal strength data and associated patterns could be determined based upon the reference wireless communication devices in the geographic area.

Once the current signal strength patterns have been determined, wireless communication system 110 compares (204) the current signal strength data patterns to historical signal strength data patterns associated with past seasonal transitions in the geographic area. The historical signal strength data patterns could be data patterns previously observed by communication system 100 or another system, or could be developed by other methods, such as a model, computer simulation, statistical data, among other methods. The historical signal strength data patterns would indicate past seasonal transitions. In some examples, the past seasonal transitions could be from fall to winter, while in other examples, the past seasonal transitions could be from winter to spring, although other seasonal transitions could also be indicated by the historical signal strength data patterns.

Wireless communication system 110 detects (205) the current seasonal transition in the geographic area based on the comparison of the current signal strength data patterns with the historical signal strength data patterns. The current signal strength data patterns could indicate a seasonal transition in the present time by comparing the current signal strength data patterns to the historical signal strength data patterns. Examples of this comparison could include comparing a rate of change, a slope of change, cyclical patterns, a trendline, or other patterns of both the current signal strength data and the historical signal strength data. The comparison would then determine a substantially similar, matching, or other comparison result of the current signal strength data and the historical signal strength data which indicates a current seasonal transition is occurring or has recently occurred.

A seasonal transition is a transition to a subsequent seasonal climate due to normal yearly cycles in the climate of a geographic area. A transition between each adjacent season of spring, summer, fall, and winter could be detected. In some examples, the current seasonal transition could be from fall to winter, while in other examples, the current seasonal transition could be from winter to spring, although other seasonal transitions could also be indicated by the comparison.

The physical indicator of a detected seasonal transition, as determined by the signal strength data pattern, could be due to many seasonal phenomena. For instance, in the example of a seasonal transition from fall to winter, a foliage change of the trees of a geographic area could indicate a seasonal transition. Once the leaves and other associated foliage of trees populating the geographic area have fallen in response to a seasonal variation in climate, the signal strength data could experience a change. For example, when the foliage of trees in a geographic area has fallen, a wireless signal may experience less attenuation throughout the geographic area. In the example of a seasonal transition from winter to spring, a snow coverage or accumulation change of the geographic area could indicate a seasonal transition. Once the snow has melted and left either a smaller amount of snow coverage or a larger portion of bare ground exposed in the geographic area, the signal strength data could experience a change. For example, when the snow coverage has melted, a wireless signal may experience fewer reflections throughout the geographic area.

Since these seasonal transitions do not typically occur rapidly or consistently, the current signal strength data patterns could then be compared to historical signal strength data patterns to detect the seasonal transition. In some examples, the comparison is initiated at a beginning of a time window when the current seasonal transition could occur in the geographic area. For example, in the Northern hemisphere, a transition from winter to spring would not be likely to occur in October, while it may be likely to occur in April, while in the Southern hemisphere the opposite may be likely. A reasonable seasonal transition time window could then be established during which the seasonal transition is initiated to be detected.

Wireless communication system 110 generates (206) an indicator when the current seasonal transition is detected. In many examples, this indicator is further transferred to other systems and equipment to improve wireless communications among wireless communication system 110, wireless communication devices 130 and 131, and other systems, such as core network 190.

In further examples, in response to the indicator, wireless communication system 110 could modify antenna positioning of antennas associated with communications with wireless communication devices in the geographic area. This antenna positioning could include repositioning the antennas downward or upward by automated mechanisms on which antennas in the geographic area are mounted. In some examples, the antenna positioning is controlled by an antenna management system, element management system, base station management system, or access node, and the indicator initiates a change in antenna positioning in these example systems.

In other examples, in response to the indicator, wireless communication system 110 could modify transmit power of transmitters associated with communications with wireless communication devices in the geographic area. In some examples, the transmit power is controlled by an antenna management system, element management system, base station management system, or access node, and the indicator initiates a change in transmit power in these example systems.

In yet further examples, wireless communication device 110 transfers the indicator to wireless communication devices 130 and 131. In response to the indicator, wireless communication devices 130 and 131 could take action such as modifying a transmit power of user communications originating from wireless communication devices 130 and 131, changing a data rate or communication style of the communications, among other actions.

Seasonal variations in a geographic area can impact the performance, reliability, and interference properties of wireless communications in the geographic area. Advantageously, by detecting a current seasonal transition in the geographic area, various communication parameters could be modified to optimize wireless communications in the geographic area. The wireless communications themselves, physical orientation of antenna elements, or other factors in communications between wireless communication devices and wireless access nodes in a communication system could be automatically tuned based on detected signal strength data patterns as compared to past signal strength data patterns to compensate for the effects of seasonal variations on the communications.

Figure 3:
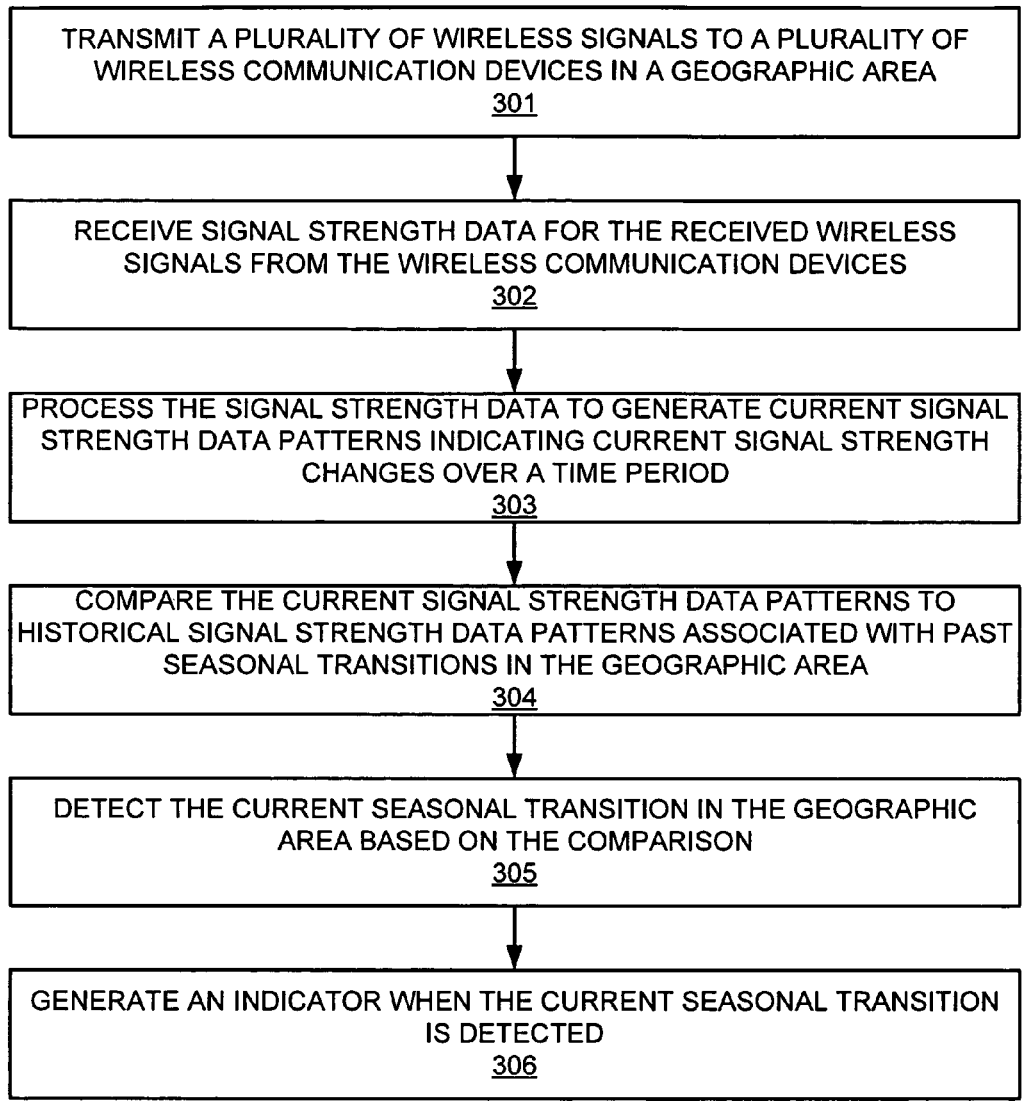
FIG. 3 is a flow diagram illustrating a method of operation of a communication system.

FIG. 3 is a flow diagram that illustrates another example method of operation of communication system 100, as found in FIG. 1. The phases shown in FIG. 3 are indicated herein parenthetically. In FIG. 3, wireless communication system 110 transmits (301) a wireless signal to each of wireless communication devices 130 and 131 in a geographic area. In some examples, the transfer of the wireless signals to wireless communication devices 130 and 131 could be initiated by a command from wireless communication system 110. In other examples, the wireless signals to wireless communication devices 130 and 131 could be wireless communications, such as user communications, and transmitted by wireless communication system 110 throughout the operation of wireless communication devices 130 and 131.

In the example shown in FIG. 1, wireless communication devices 130 and 131 are in the same geographic area. In typical examples, since wireless communication devices 130 and 131 communicate with wireless communication system 110 over a finite geographic range, the geographic area, while of possibly varied size, would nonetheless typically depend upon the specific implementation of communication system 100. Thus, in some examples, the geographic area could represent a region of wireless signal coverage where wireless communication devices 130 and 131 could communicate over wireless links 120 and 121 with wireless communication system 110. In other examples, the geographic region could represent a region served by wireless communication system 110, a wireless coverage area of an access node within communication system 100, or other regions.

In some examples, wireless communication devices 130 and 131 have a substantially fixed location in the geographic area, such as a residence, business, or service provider location, while in other examples, wireless communication devices 130 and 131 are mobile and free to move throughout the geographic area.

Wireless communication system 110 receives (302) signal strength data for the transmitted wireless signals from wireless communication devices 130 and 131. The signal strength data could include an RF signal strength, a signal to noise ratio (SNR), a signal to interference and noise ratio (SINR), carrier to interference and noise ratio (CINR), or other data of the wireless signals as determined by wireless communication devices 130 and 131.

Wireless communication system 110 processes (303) the signal strength data to generate current signal strength data patterns indicating how current signal strength data changes over a time period. The signal strength data could be processed over a present time period to develop a pattern of the signal strength data for that time period. The time period could be of a varied duration, depending upon the method used to process the signal strength data to develop a pattern. In some examples, the time period could be long, such as over the course of weeks.

In examples of fixed location wireless communication devices, the signal strength data could be determined at the fixed locations, with wireless communication devices 130 and 131 possibly acting as reference wireless communication devices. Changes in signal strength data could be determined based upon the reference wireless communication devices in the geographic area.

Once the current signal strength patterns have been generated, wireless communication system 110 compares (304) the current signal strength data patterns to historical signal strength data patterns associated with past seasonal transitions in the geographic area. The historical signal strength data patterns could be data patterns previously observed by communication system 100 or another system, or could be developed by other methods, such as a model, computer simulation, statistical data, among other methods. The historical signal strength data patterns would indicate past seasonal transitions. In some examples, the past seasonal transitions could be from fall to winter, while in other examples, the past seasonal transitions could be from winter to spring, although other seasonal transitions could also be indicated by the historical signal strength data patterns.

Wireless communication system 110 detects (305) the current seasonal transition in the geographic area based on the comparison with the historical signal strength data patterns. The current signal strength data patterns could indicate a seasonal transition in the present time by comparing the current signal strength data patterns to the historical signal strength data patterns. Examples of this comparison could include comparing a rate of change, a slope of change, cyclical patterns, a trendline, or other patterns of both the current signal strength data and the historical signal strength data. The comparison would then determine a substantially similar, matching, or other comparison result of the current signal strength data and the historical signal strength data which indicates a current seasonal transition is occurring or has recently occurred.

The physical indicator of a detected seasonal transition, as determined by the signal strength data pattern, could be due to many seasonal phenomena. For instance, in the example of a seasonal transition from fall to winter, a foliage change of the trees of a geographic area could indicate a seasonal transition. Once the leaves and other associated foliage of trees populating the geographic area have fallen in response to a seasonal variation in climate, the signal strength data could experience a change. For example, when the foliage of trees in a geographic area has fallen, a wireless signal may experience less attenuation throughout the geographic area. In the example of a seasonal transition from winter to spring, a snow coverage or accumulation change of the geographic area could indicate a seasonal transition. Once the snow has melted and left either a smaller amount of snow coverage or a larger portion of bare ground exposed in the geographic area, the signal strength data could experience a change. For example, when the snow coverage in has melted, a wireless signal may experience more attenuation throughout the geographic area.

Since these seasonal transitions do not typically occur rapidly or consistently, the current signal strength data patterns could then be compared to historical signal strength data patterns to detect the seasonal transition. In some examples, the comparison is initiated at a beginning of a time window when the current seasonal transition could occur in the geographic area. For example, in the Northern hemisphere, a transition from winter to spring would not be likely to occur in October, while it may be likely to occur in April, while in the Southern hemisphere the opposite may be likely. A reasonable seasonal transition time window could then be established during which the seasonal transition is initiated to be detected.

Wireless communication system 110 generates (306) an indicator when the current seasonal transition is detected. In many examples, this indicator is further transferred to other systems and equipment to improve wireless communications among wireless communication system 110, wireless communication devices 130 and 131, and other systems, such as core network 190.

Figure 4:
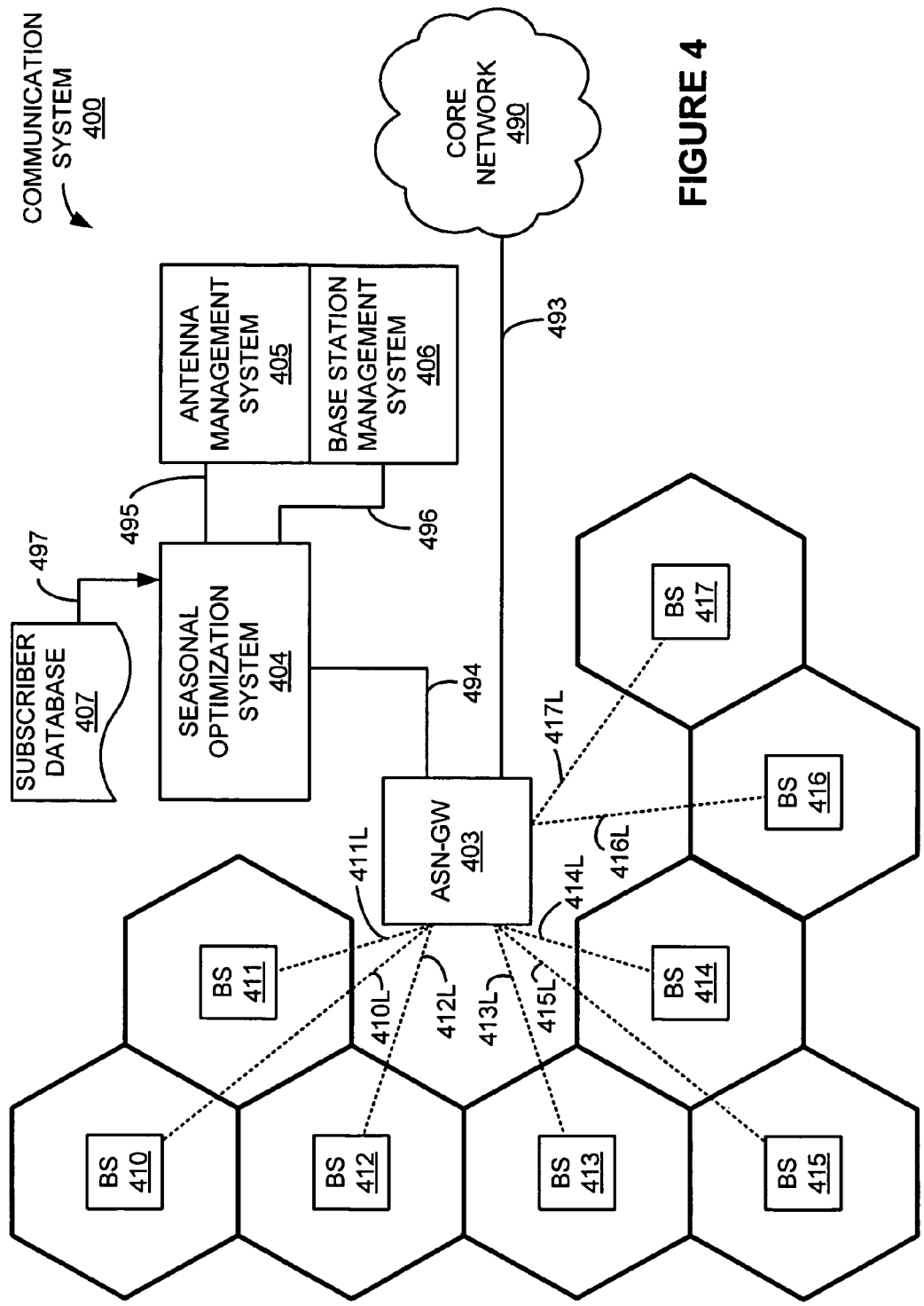
FIG. 4 is a system diagram illustrating a communication system.

FIG. 4 is a system diagram illustrating communication system 400. Communication system 400 includes base stations (BS) 410-417, access service network gateway (ASN-GW) 403, seasonal optimization system 404, antenna management system 405, base station management system 406, subscriber database 407, and core network 490.

Base stations 410-417 and ASN-GW 403 communicate over links 410L-417L, respectively. ASN-GW 403 and seasonal optimization system 404 communicate over link 494. ASN-GW 403 and core network 490 communicate over link 493. Seasonal optimization system 404 and antenna management system communicate over link 495. Seasonal optimization system 404 and base station management system 406 communicate over link 406. Seasonal optimization system 404 can exchange information with subscriber database 407 over link 497.

Each base station 410-417 is situated in an associated hexagonal-shaped wireless coverage area. Each wireless coverage area represents an area over which each base station 410-417 is able to service wireless communication devices. It should be understood that in this example, wireless communication devices are distributed throughout each wireless coverage area of base station 410-417. In this example, the wireless communication devices are generally fixed in geographic location, where their geographic location remains generally confined to a residence, business locale, or other location.

Although hexagonal regions, as defined by each base station 410-417 coverage area, are shown in FIG. 4, it should be understood that the regions could be of other configurations or of a different quantity, as determined by geographic features, empirical data, the desires of the operators of wireless communication system 400, or by other factors, including combinations thereof. Additionally, as described herein, the representative hexagonal coverage areas may experience seasonal fluctuations in both area and shape.

Base stations 410-417 comprise base station equipment in this example, and further include at least an antenna and antenna tower. Base stations 410-417 are configured to exchange communications wirelessly with wireless communication devices within the coverage area of each base station 410-417.

ASN-GW 403 is configured to monitor and control the operations of base stations 410-417—in this example, base stations 410-417 are operated by the same service provider as ASN-GW 403. In some examples, ASN-GW 403 acts as a gateway for communications between wireless communication devices within the various coverage areas and core network 490.

Core network 490 includes a core network of the service provider in this example, comprising an Internet network, local area networks, and other telecommunications equipment and networks. In some examples, core network 490 acts as a gateway for communications between ASN-GW 403 and further wireless communication systems, the Internet, or telephony systems.

Seasonal optimization system 404 includes equipment for detecting a current seasonal transition, as well as processing equipment to determine signal strength data patterns as described herein. Seasonal optimization system 404 could incorporate a computer microprocessor, circuitry, or some other processing device or software system, and may be distributed among multiple processing devices. In some examples, seasonal optimization system 404 is located within the same equipment as ASN-GW 403. Seasonal optimization system 404 may also include software such as an operating system, logs, databases, utilities, drivers, networking software, or other software stored on a computer-readable medium.

Antenna management system 405 includes equipment for managing various functions and parameters of the antennas used by base stations 410-417 in communications with wireless communication devices. The various functions and parameters could include physical down tilt and azimuth of antenna elements, or a beamwidth of RF signals associated with the antennas, among other parameters.

Base station management system 406 includes equipment for managing various functions and parameters of base stations 410-417 in communications with wireless communication devices. The various functions and parameters could include frequency selection and usage, wireless protocol parameters, lists of neighboring coverage areas and base stations, preamble parameters, transmission power, among other parameters.

Subscriber database 407 includes a database comprising at least a collection of wireless communication devices subscribed to communication service of communication system 400. Subscriber database 407 could include only the fixed location wireless communication devices used in detecting signal strength data in some examples. In addition to a collection of wireless communication devices, information about each wireless communication device could be included. This information could include an identifier, a geographic location such as latitude and longitude, a measurement of reference data for signal strength, signal to noise ratios, or other information for each wireless communication device, among other information. The information could be updated regularly, such as daily or weekly and stored as well.

Antenna management system 405, base station management system 406, and subscriber database 407 could each incorporate a computer microprocessor, circuitry, or some other processing device or software system, and may be distributed among multiple processing devices. In some examples, antenna management system 405, base station management system 406, or subscriber database 407 are located within the same equipment as ASN-GW 403 or seasonal optimization system 404. Antenna management system 405, base station management system 406, and subscriber database 407 may also include software such as an operating system, logs, utilities, drivers, networking software, databases, or other software stored on a computer-readable medium.

In this example, links 494-497 each comprise an IP networking connection, links 410L-417L each comprise a T1 connection, and link 393 comprises an optical networking connection. Wireless links, not shown in FIG. 4 for clarity, between base stations 410-417 and the wireless communication devices in the coverage areas of base stations 410-417 each comprise a wireless link operating using the WiMAX protocol in this example.

Figure 5:
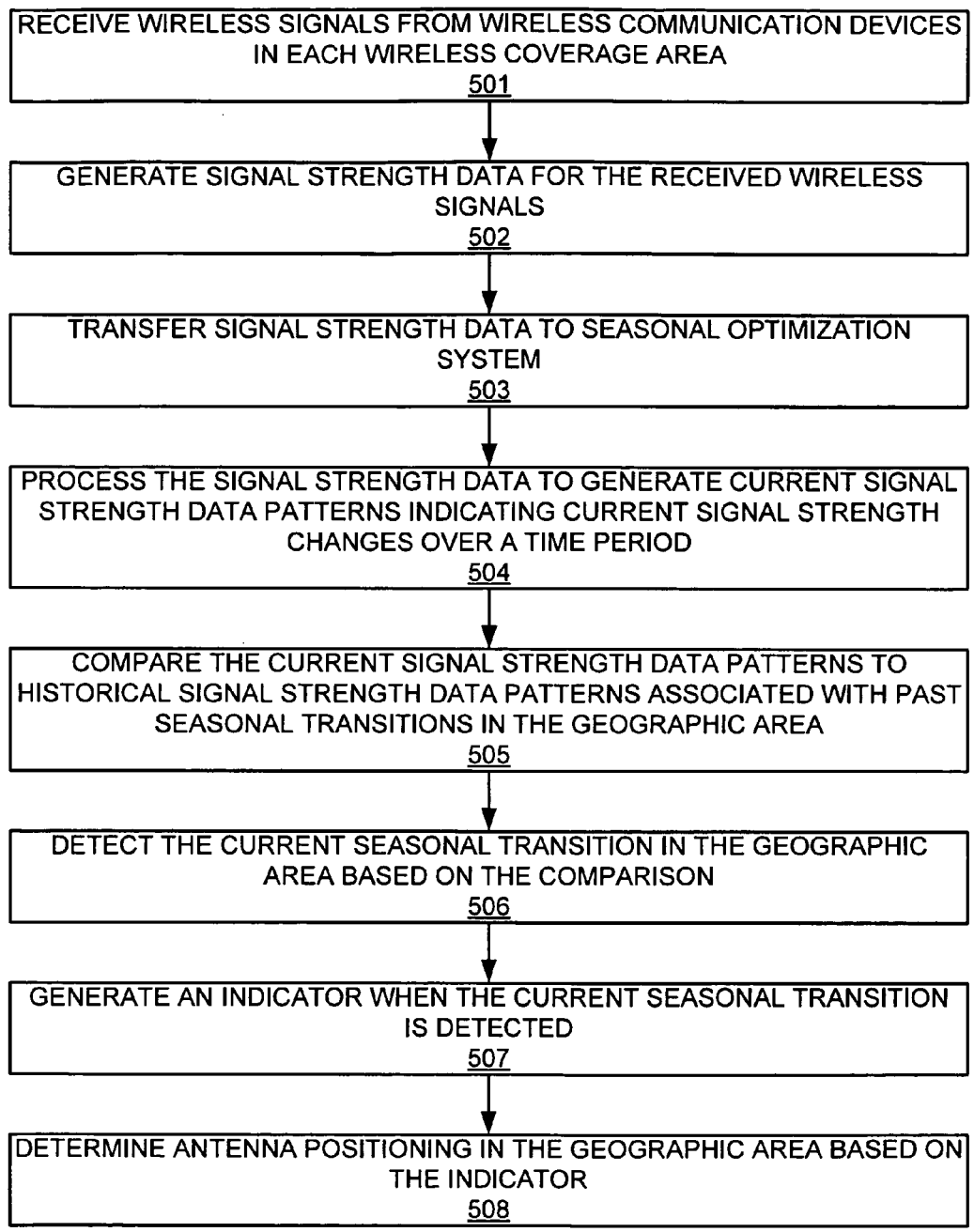
FIG. 5 is a flow diagram illustrating a method of operation of a communication system.

FIG. 5 is a flow diagram that illustrates an example method of operation of communication system 400, as found in FIG. 4. The phases shown in FIG. 5 are indicated herein parenthetically. In FIG. 5, each base station 410-417 receives (501) wireless signals from the wireless communication devices within the wireless coverage area associated with each base station 410-417. Each base station 410-417 then generates (502) signal strength data for the received wireless signals. This signal strength data could include RF signal strength, a signal to noise ratio (SNR), a signal to interference and noise ratio (SINR), carrier to interference and noise ratio (CINR), or other data of the wireless signals as determined by each base station 410-417.

This signal strength data is then transferred (503) by base stations 410-417 to seasonal optimization system 404 through ASN-GW 403 over links 410L-417L. Seasonal optimization system 404 processes (504) the signal strength data to generate current signal strength data patterns indicating current signal strength changes over a time period. As signal strength data is received by seasonal optimization system 404, the signal strength data could be transferred to subscriber database 407 and stored as associated with a wireless communication device. In some examples, the signal strength data over the time period could be stored and retrieved from subscriber database 407 and subsequently processed by seasonal optimization system 404. After processing, current signal strength data patterns in the signal strength data could be determined.

The time period could be of a varied duration, depending upon the method used to process the signal strength data to develop a pattern. In some examples, the time period could be long, such as over the course of weeks. In examples of fixed location wireless communication devices, the signal strength data could be determined for the fixed locations. Changes in signal strength data could be determined based upon the reference wireless communication devices in the geographic area.

Once the current signal strength patterns have been determined, seasonal optimization system 404 compares (505) the current signal strength data patterns to historical signal strength data patterns associated with past seasonal transitions in the geographic area. The historical signal strength data patterns could be data patterns previously observed by seasonal optimization system 404 or another system, or could be developed by other methods, such as a model, computer simulation, statistical data, among other methods. The historical signal strength data patterns would indicate past seasonal transitions. In some examples, the past seasonal transitions could be from fall to winter, while in other examples, the past seasonal transitions could be from winter to spring, although other seasonal transitions could also be indicated by the historical signal strength data patterns.

This historical signal strength data could also be stored in subscriber database 407 and retrieved by seasonal optimization system 404, similar to the current signal strength data. The historical signal strength data could be analyzed contemporaneously with the current signal strength data or at a previous time to determine patterns in the historical signal strength data.

Seasonal optimization system 404 then detects (506) the current seasonal transition in the geographic area based on the comparison with the historical signal strength data patterns. The current signal strength data patterns could indicate a seasonal transition in the present time by comparing the current signal strength data patterns to the historical signal strength data patterns. Examples of this comparison could include comparing a rate of change, a slope of change, cyclical patterns, a trendline, or other patterns of both the current signal strength data and the historical signal strength data. The comparison would then determine a substantially similar, matching, or other comparison result of the current signal strength data and the historical signal strength data which indicates a current seasonal transition is occurring or has recently occurred.

Since seasonal transitions do not typically occur rapidly or consistently, the current signal strength data patterns could then be compared to historical signal strength data patterns to detect the seasonal transition. In some examples, the comparison is initiated at a beginning of a time window when the current seasonal transition could occur in the geographic area. In other examples, additional processing or hysteresis could be applied to prevent false detection of a seasonal transition due to short-term phenomena, such as storms, wind, humidity, precipitation, storm damage, human or animal activities, or other phenomena.

Seasonal optimization system 404 generates (507) an indicator when the current seasonal transition is detected. In many examples, this indicator is further transferred to other systems and equipment to improve wireless communications in communication system 400, such as communications between wireless communication devices and other systems, for example, core network 190.

In this example, seasonal optimization system 404 transfers the indicator to at least antenna management system 405 over link 495. Antenna management system 405 determines (508) antenna positioning information for the geographic area in response to the indicator. Antenna management system 405 could then further transfer this antenna positioning information to base stations 410-417 through ASN-GW 403. This antenna positioning information could include positioning information for the down tilt or azimuth, and employed by automated mechanisms on antennas associated with each base station 410-417 in the geographic area. In addition to positioning information, information relating to a beamwidth of the antennas associated with base stations 410-417 could also be determined by antenna management system 405.

In further examples, seasonal optimization system 404 transfers the indicator to base station management system 406 over link 496. Base station management system 406 identifies a modified communication parameter for base stations 410-417 in the geographic area in response to the indicator. Base station management system 406 could then further transfer the modified communication parameter information to base stations 410-417 through ASN-GW 403. The communication parameters could include frequency selection and usage, wireless protocol parameters, lists of neighboring coverage areas and base stations, preamble parameters, transmission power, among other parameters.

Figure 6A:
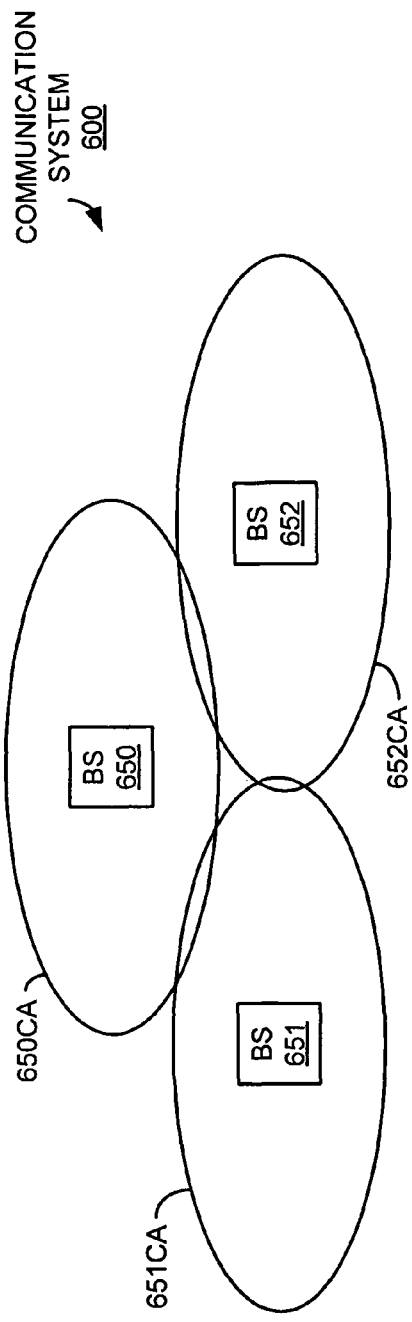
FIGS. 6A and 6B are diagrams illustrating wireless coverage areas.
Figure 6B:
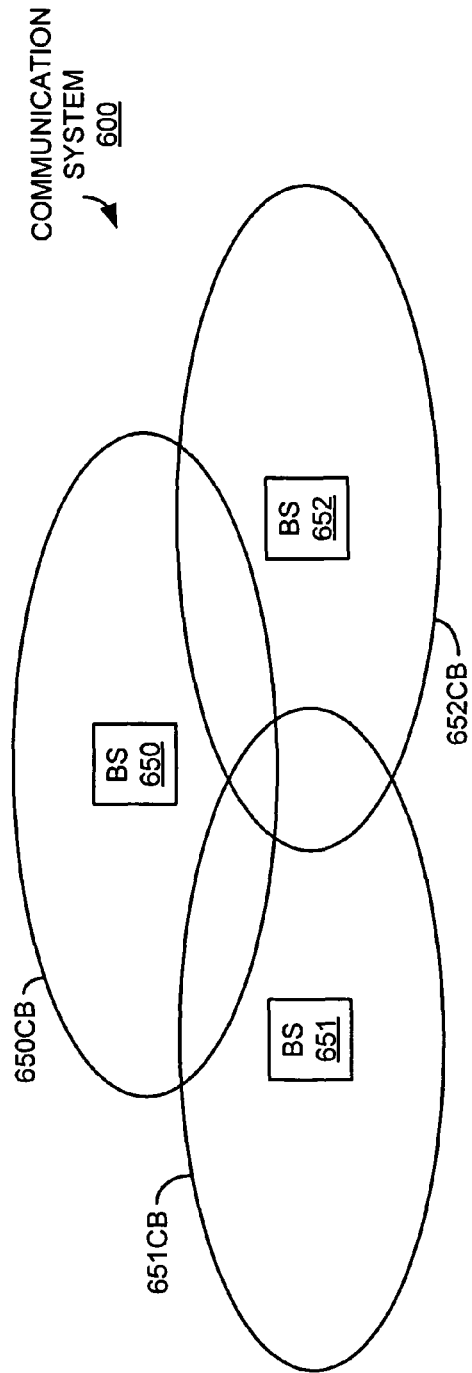

FIGS. 6A and 6B are diagrams illustrating seasonal changes in wireless coverage areas of communication system 600. Communication system 600 includes base stations (BS) 650-652. As shown in FIG. 6A, base stations 650-652 each have an associated wireless coverage area 650CA-652CA. FIG. 6B shows base stations 650-652 with wireless coverage areas 650CB-652CB, which are of a different size than wireless coverage areas 650CA-652CA. In some examples, these wireless coverage areas are similar in operation to those associated with each base station 410-417 as illustrated in FIG. 4. Other elements of communication system 600, such as wireless communication devices within each wireless coverage area, ASN-GW, core networks, or other associated communication equipment are omitted for clarity, and could reside within communication system 600 in FIGS. 6A and 6B.

In the example of a seasonal transition from fall to winter, the wireless coverage areas associated with base stations 650-652 could undergo an increase in wireless coverage area size. This could be visualized by fall seasonal wireless coverage areas 650CA-652CA found in FIG. 6A increasing in relative size when compared to winter seasonal wireless coverage areas 650CB-652CB in FIG. 6B. In other examples, such as a winter to spring transition, the opposite could be visualized by comparing FIG. 6B to FIG. 6A and noticing a decrease in relative size of the respective wireless coverage areas.

In this example, the fall seasonal wireless coverage area sizes are used as a baseline, with associated wireless coverage areas 650CA-652CA in FIG. 6A. Wireless coverage areas 650CA-652CA could originally be determined by many possible methods. One example method would be to develop a computer model of wireless signal propagation based upon the location, height, and communication properties of each base station 650-652. Other examples may include empirically measuring the extent of each coverage area 650CA-652CA by the use of measurement devices or wireless communication devices positioned to communicate with a particular base station.

In this example, a change in the amount of foliage in trees within each wireless coverage area, as well as the geographic area encompassing many wireless coverage areas, could accompany a seasonal transition from fall to winter. This change in the amount of foliage could allow wireless signals to propagate more easily, with less reflection and attenuation due to leaves, seeds, fruit, or other foliage. As can be seen in FIG. 6B, the loss of foliage in the trees within the geographic area encompassing base stations 650-652 during winter has allowed wireless signals to propagate further than during fall. Thus, the wireless coverage areas associated with base stations 650-652 have increased in size and are represented by wireless coverage areas 650CB-652CB.

The larger wireless coverage areas 650CB-652CB could introduce several problems into the communications between wireless communication devices attempting to communicate through base stations 650-652, and could also introduce problems into the associated communication equipment of base stations 650-652. For example, these problems could include crosstalk, interference, wasted power, overlapping cell coverage areas, increased handoff and associated signaling, among other problems, which could lead to a decreased level of service or poor user experience for wireless communication devices within overlapping sections of wireless coverage areas 650CB-652CB as well as increased strain and processing required in base stations 650-652 to handle the possible increased handoff and associated signaling.

It should be noted that in addition to seasonal changes, various other short-term phenomena could affect the size of the wireless coverage areas associated with base stations 650-652. These short-term phenomena could include temporary snow, rain, humidity, reflections from ground objects, short-term human and animal activities. The methods described herein for comparing the current signal strength data to historical signal strength data patterns would advantageously prevent such short-term phenomena from causing premature or false detection of a seasonal transition. Additionally, the seasonal changes in wireless coverage area could be different for different regions across a continent, land mass, or even hemisphere, and could be factored into the historical signal strength data patterns Likewise, differences in urban and rural settings of the geographic area could also be factored into the historical signal strength data patterns.

Advantageously, by detecting the changes in wireless coverage areas due to seasonal transitions, the various parameters associated with antennas, antenna elements, base stations, and communication protocols used in facilitating communications between wireless communication devices and base stations within a communication system can be optimized automatically. This can lead to a decrease in the problems associated with overlapping wireless coverage areas as described herein, to a better user experience, and more reliable communications.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of detecting a current seasonal transition from fall to winter or from winter to spring in a geographic area, the method comprising:
   receiving a plurality of wireless signals from a plurality of wireless communication devices in the geographic area;
   generating signal strength data for the received wireless signals;
   processing the signal strength data to generate current signal strength data patterns indicating how current signal strength changes over a present time period;
   comparing the current signal strength data patterns indicating how current signal strength changes over the present time period to historical signal strength data patterns indicating how historical signal strength data changes, which indicate past seasonal transitions in the geographic area to determine whether the current signal strength data patterns are substantially similar to the historical signal strength data patterns;
   detecting the current seasonal transition in the geographic area when the current signal strength data patterns are determined to be substantially similar to the historical signal strength data patterns; and
   generating an indicator when the current seasonal transition is detected.

2. The method of detecting the current seasonal transition of claim 1, further comprising:
   modifying transmit power for a wireless communication service in the geographic area in response to the indicator.

3. The method of detecting the current seasonal transition of claim 1, further comprising:
   modifying antenna positioning for a wireless communication service in the geographic area in response to the indicator.

4. The method of detecting the current seasonal transition of claim 1, wherein comparing the current signal strength data patterns comprises initiating the comparison at a beginning of a time window when the current seasonal transition could occur in the geographic area.

5. The method of detecting the current seasonal transition of claim 1, wherein the current seasonal transition is caused by a foliage change in the geographic area.

6. The method of detecting the current seasonal transition of claim 1, wherein the current seasonal transition is caused by a snow coverage change in the geographic area.

7. The method of detecting the current seasonal transition of claim 1, wherein the wireless signals comprise wimax signals.

8. The method of detecting the current seasonal transition of claim 1, wherein the signal strength data further comprises signal-to-noise ratio data.

9. The method of detecting the current seasonal transition of claim 1, wherein each of the plurality of wireless communication devices in the geographic area have a fixed geographic location within the geographic area.

10. The method of detecting the current seasonal transition of claim 1, further comprising:
    transferring the indicator to the wireless communication devices; and
    in the wireless communication devices, individually modifying transmit power for communications originating from the wireless communication devices in response to the indicator.

11. A method of detecting a current seasonal transition from fall to winter or from winter to spring in a geographic area, the method comprising:
    transmitting a plurality of wireless signals to a plurality of wireless communication devices in the geographic area;
    receiving signal strength data for the transmitted wireless signals from the wireless communication devices;
    processing the signal strength data to generate current signal strength data patterns indicating how current signal strength changes over a present time period;
    comparing the current signal strength data patterns indicating how current signal strength changes over the present time period to historical signal strength data patterns indicating how historical signal strength data changes, which indicate past seasonal transitions in the geographic area to determine whether the current signal strength data patterns are substantially similar to the historical signal strength data patterns;
    detecting the current seasonal transition in the geographic area when the current signal strength data patterns are determined to be substantially similar to the historical signal strength data patterns; and
    generating an indicator when the current seasonal transition is detected.

12. The method of detecting the current seasonal transition of claim 11, further comprising:
    modifying transmit power for a wireless communication service in the geographic area in response to the indicator.

13. The method of detecting the current seasonal transition of claim 11, further comprising:
    modifying antenna positioning for a wireless communication service in the geographic area in response to the indicator.

14. The method of detecting the current seasonal transition of claim 11, wherein comparing the current signal strength data patterns comprises initiating the comparison at a beginning of a time window when the current seasonal transition could occur in the geographic area.

15. The method of detecting the current seasonal transition of claim 11, wherein the current seasonal transition is caused by a foliage change in the geographic area.

16. The method of detecting the current seasonal transition of claim 11, wherein the current seasonal transition is caused by a snow coverage change in the geographic area.

17. The method of detecting the current seasonal transition of claim 11, wherein the wireless signals comprise wimax signals.

18. The method of detecting the current seasonal transition of claim 11, wherein the signal strength data further comprises signal-to-noise ratio data.

19. The method of detecting the current seasonal transition of claim 11, wherein each of the plurality of wireless communication devices in the geographic area have a fixed geographic location within the geographic area.

20. The method of detecting the current seasonal transition of claim 11, further comprising:
transferring the indicator to the wireless communication devices; and
in the wireless communication devices, individually modifying transmit power for communications originating from the wireless communication devices in response to the indicator.

* * * * *